United States Patent [19]

Bailey

[11] Patent Number: 5,801,693
[45] Date of Patent: Sep. 1, 1998

[54] "CLEAR" EXTENSION TO A PASTE COMMAND FOR A CLIPBOARD FUNCTION IN A COMPUTER SYSTEM

[75] Inventor: John Hudson Bailey, Aptos, Calif.

[73] Assignee: International Business Machines Corporation, Armonk, N.Y.

[21] Appl. No.: 676,857

[22] Filed: Jul. 3, 1996

[51] Int. Cl.[6] .................................................. G06T 11/00
[52] U.S. Cl. .................................................. 345/339
[58] Field of Search ................................. 395/144-149, 395/133, 135, 155-161; 707/500, 502, 526, 527, 530, 531; 345/433, 435, 326, 327, 339, 340, 346, 347

[56] References Cited

PUBLICATIONS

Brockschmidt "Inside OLE 2" (1994).
Person, R., and Rose, K., *Using Windows 3.1*, Special Edition, 1993, pp. 55-56, 91-94, 211-222, 485-490, 593-594, and 647-648.
Petzold, *Programming Windows 3.1*, 3rd Edition, 1992, pp. 251-252 and 791-822.
Najjar, L.J. and Zimmatore, J.J., "Multiple Item On-Line Clipboard," *IBM Technical Disclosure Bulletin*, vol. 35, No. 2, Jul. 1992.
Haynes, T., Melkus, L. and Schell, D., "Combined Cut (or Copy) and Paste Functions Via Menus in a GUI," *IBM Technical Disclosure Bulletin*, vol. 35, No., 6, Nov. 1992.

*Primary Examiner*—Almis R. Jankus
*Attorney, Agent, or Firm*—Merchant, Gould, Smith, Edell, Welter, & Schmidt

[57] ABSTRACT

A method, apparatus, and article of manufacture providing a "clear" extension to a paste command for a clipboard function in a computer system. Data is displayed on a monitor of the computer and one or more commands are received from an operator to select an insertion point in the data displayed on the monitor, to paste the contents of a clipboard memory in the computer to the selected insertion point in the data displayed on the monitor, and to selectively keep or clear the contents of the clipboard memory after the contents of the clipboard memory have been pasted to the selected insertion point.

21 Claims, 7 Drawing Sheets

"CLEAR" EXTENSION TO A PASTE COMMAND FOR A CLIPBOARD FUNCTION IN A COMPUTER SYSTEM

CROSS-REFERENCE TO RELATED APPLICATIONS

This application is related to application Ser. No. 08/676,500, entitled "AN 'APPEND' EXTENSION TO CUT AND COPY COMMANDS FOR A CLIPBOARD FUNCTION IN A COMPUTER SYSTEM," filed Jul. 3, 1996, pending, by John H. Bailey, IBM Docket No. ST996012, which application is incorporated by reference herein.

BACKGROUND OF THE INVENTION

1. Field of the Invention.

The present invention generally relates to graphical user interfaces for computer systems, and in particular to a method, apparatus, and article of manufacture providing a "clear" extension to a paste command for a clipboard function in a computer system.

2. Description of Related Art.

Most operating systems for personal computers, such as OS/2™, Windows™, and Macintosh™, provide a "clipboard" function that allows users to Copy, Cut, and Paste selected data from one application to another or within the same application. This function is used extensively because it allows the user to avoid re-entering data already present in the computer. Generally, all kinds of data, including text, graphics, equations, and tables, can be transferred to and from the clipboard function.

The clipboard function provides both "Edit" functions and a reserved area of memory. The reserved area of memory temporarily stores the copied data. The Edit functions, including Copy, Cut, and Paste commands, may be invoked from a drop-down menu or short-cut keystrokes. The Copy command copies from the display into the clipboard memory. The Cut command removes the selected data from the display into the clipboard memory. The Paste command copies the selected data from the clipboard memory into a displayed application at an indicated insertion point.

Prior to copying or cutting the data into the clipboard memory, the data must be selected. The user generally uses the keyboard or mouse to select the desired data from a screen display. Then, the user invokes either the Copy or Cut command, and the selected data is transferred by the operating system into the clipboard memory.

To select text with the mouse, the user usually positions an "I-beam" pointer at the beginning of the desired text, clicks and holds down the left mouse button, drags the pointer to the end of the desired text, and releases the left mouse button. To select text with the keyboard, the user usually positions the cursor at the beginning of the desired text, presses the Shift key, uses arrow keys to move to the end of the desired text, and then releases the Shift key. Such selected text typically appears on the screen display with a shaded background.

To select an object such as a graphics object with the mouse, the user usually clicks on the object. To select an object such as a graphics object with the keyboard, the user merely positions the cursor onto the object. Selected objects, such as graphics, usually appear with selection handles on each side and corner.

The copied or cut data is stored in the clipboard memory and then pasted to a selected insertion point. To select the insertion point with the mouse, the user usually positions an "I-beam" pointer at the desired location. To select the insertion point with the keyboard, the user usually positions the cursor at the desired location using the cursor control keys. Thereafter, the user either selects the "Paste" command from the "Edit" menu or enters a control key combination, such as CTL+V, to cause the data stored in the clipboard memory to be copied to the insertion location.

In the prior art, the copied data generally remains in the clipboard memory until it is replaced with another selected portion. Only if the user performs another Copy or Cut command will the contents of the clipboard memory be replaced or overwritten. However, there is a need in the art for functionality that allows the current contents of a clipboard memory to be cleared or kept, under the user's control.

SUMMARY OF THE INVENTION

To overcome the limitations in the prior art described above this invention discloses a method, apparatus, and article of manufacture providing a "clear" extension to a paste command for a clipboard function in a computer system.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
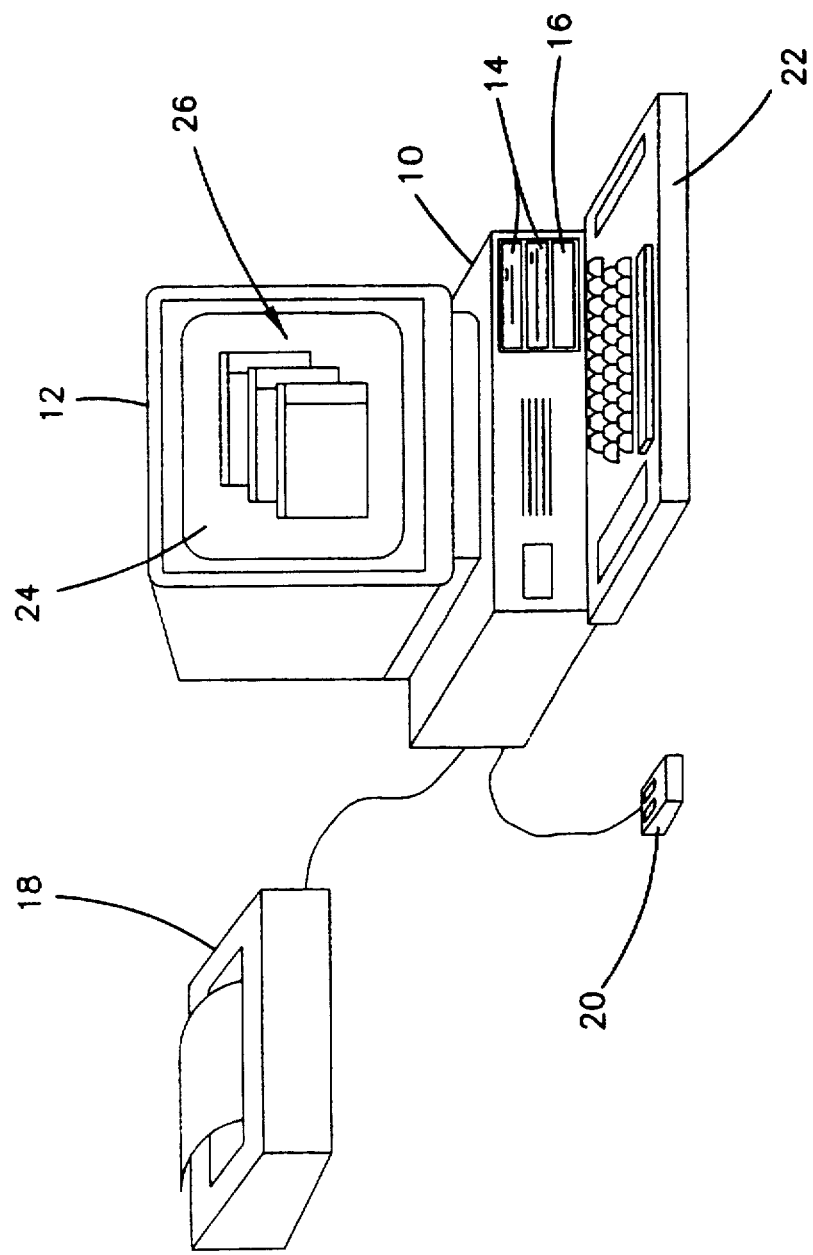
FIG. 1 is a block diagram that illustrates an exemplary hardware environment of the present invention.

FIG. 1 is a block diagram that illustrates an exemplary hardware environment of the present invention. The present invention is typically implemented using a personal computer 10 comprised of a microprocessor, random access memory (RAM), read-only memory (ROM), and other components. It is envisioned that attached to the personal computer 10 may be a monitor 12, hard and/or floppy disk drives 14, CD-ROM drives 16, printer 18, and other peripherals. Also included in the preferred embodiment may be input devices, for example, a mouse pointing device 20 and a keyboard 22.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The personal computer 10 operates under the control of an operating system 24, such as the OS/2™, Windows™, or Macintosh™ operating systems, which is represented in FIG. 1 by the screen display on the monitor 12. The personal computer 10 executes one or more computer programs 26, which are represented in FIG. 1 by the "windows" displayed on the monitor 12, operating under the control of the operating system 24.

Generally, the operating system 24 and the computer programs 26 are tangibly embodied in a computer-readable medium, e.g. one or more of the fixed and/or removable data storage devices 14 and 16. Both the operating system 24 and the computer programs 26 may be loaded from the data storage devices 14 and 16 into the random access memory of the computer 10 for execution by the microprocessor. Both the operating system 24 and the computer programs 26 comprise instructions which, when read and executed by the microprocessor of the computer 10, causes the computer 10 to perform the steps necessary to execute the steps or elements of the present invention.

The present invention comprises an enhanced clipboard function that is preferably implemented by functions resident in the operating system 24 and/or computer programs 26, which functions access a designated portion of the random access memory of the computer 10 known as a clipboard memory. In the present invention, the computer displays data on the monitor 12 and then receives commands from an operator. A first command received from the operator would be to select an insertion point in the data displayed on the monitor 12, and the computer 10 would then select the insertion point in the data displayed on the monitor 12 in response thereto. A second command received from the operator would be to paste the contents of a clipboard memory in the computer 10 to the selected insertion point in the data displayed on the monitor 12, and the computer 10 would then paste the contents of the clipboard memory to the selected insertion point in response thereto. The second command would also selectively indicate whether to clear the contents of the clipboard memory after the pasting step, or alternatively, whether to keep the contents of the clipboard memory intact (the default). Thereafter, the computer 10 would selectively clear the contents of the clipboard memory in accordance with the second command received from the operator.

Figure 2:
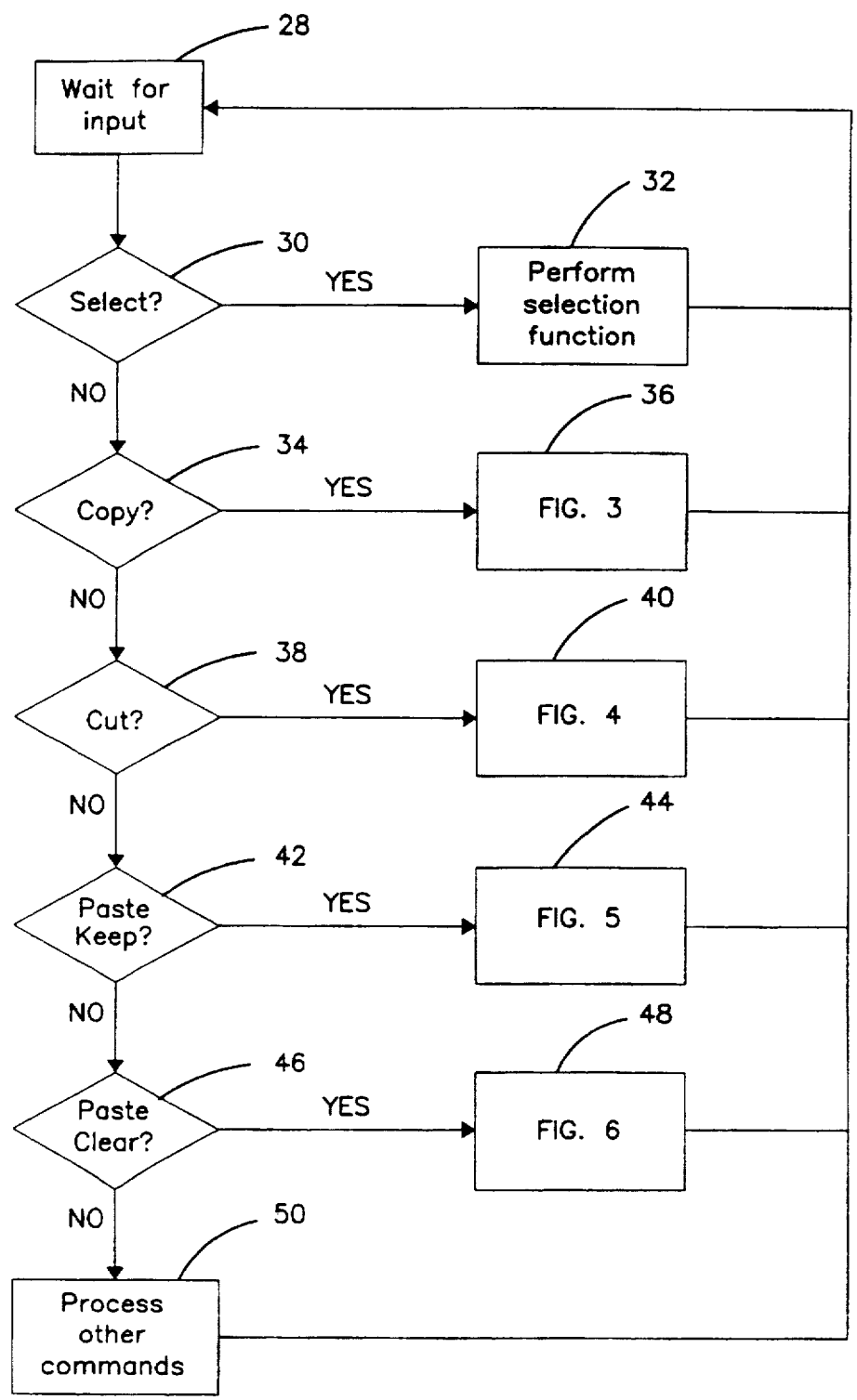
FIG. 2 is a flowchart illustrating the operation of the computer in accordance with the present invention.

FIG. 2 is a flowchart illustrating the operation of the computer 10 in accordance with the present invention. Block 28 represents the computer 10 waiting for input, such as the activation of a key on the keyboard, the activation of a selection button on the mouse, or any other activation via an input device. After input is received, control transfers to Block 30.

Block 30 is a decision block that represents the computer 10 determining whether the input indicates that the user has entered a command to select a portion of the data displayed on the monitor 12, or alternatively, to select an insertion point in the data displayed on the monitor 12. If so, control transfers to Block 32, which represents the computer 10 performing the select function, i.e., selecting the desired data or positioning the cursor at the desired insertion point.

Block 34 is a decision block that represents the computer 10 determining whether the input indicates that the user has entered a copy command to copy the selected data from the display on the monitor 12 and copy it into the clipboard memory. If so, control transfers to Block 36, which represents the computer 10 performing the copy function, as described in more detail in FIG. 3.

Block 38 is a decision block that represents the computer 10 determining whether the input indicates that the user has entered a cut command to cut the selected data from the display on the monitor 12 and insert it into the clipboard memory. If so, control transfers to Block 40, which represents the computer 10 performing the cut function, as described in more detail in FIG. 4.

Block 42 is a decision block that represents the computer 10 determining whether the input indicates that the user has entered a paste/keep command to paste the current contents of the clipboard memory to the selected insertion point on the monitor 12, without thereafter altering the contents of the clipboard memory. If so, control transfers to Block 44, which represents the computer 10 performing the paste/keep function, as described in more detail in FIG. 5.

Block 46 is a decision block that represents the computer 10 determining whether the input indicates that the user has entered a paste/clear command to paste the current contents of the clipboard memory to the selected insertion location on the monitor 12, and thereafter clear the contents of the clipboard memory. If so, control transfers to Block 48, which represents the computer 10 performing the paste/clear function, as described in more detail in FIG. 6.

Block 50 represents the computer 10 processing all other commands, after which control transfers back to Block 28 to wait for additional input.

Figure 3:
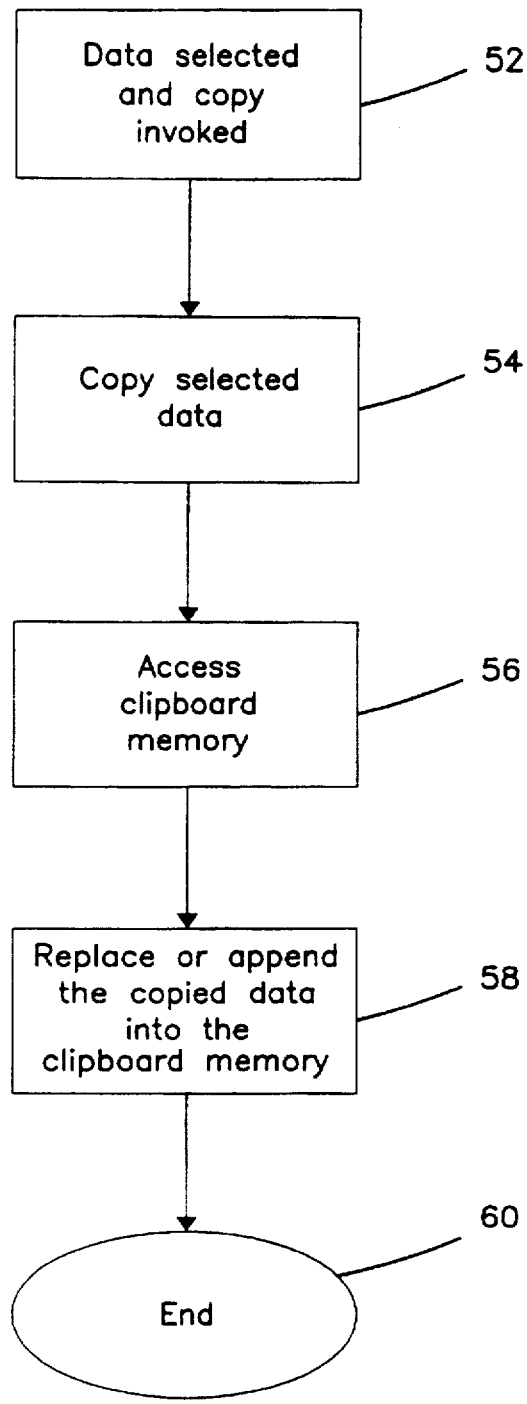
FIG. 3 is a flowchart showing the steps performed by the computer for the copy function.

FIG. 3 is a flowchart showing the steps performed by the computer 10 for the copy function. Block 52 represents the start of the function, wherein data has been selected and the copy function invoked by the operator. Block 54 represents the computer 10 copying the selected data. Block 56 represents the computer 10 accessing the clipboard memory. Block 58 represents the computer 10 replacing or appending the copied data into the clipboard memory. Block 60 represents the termination of the function.

Figure 4:
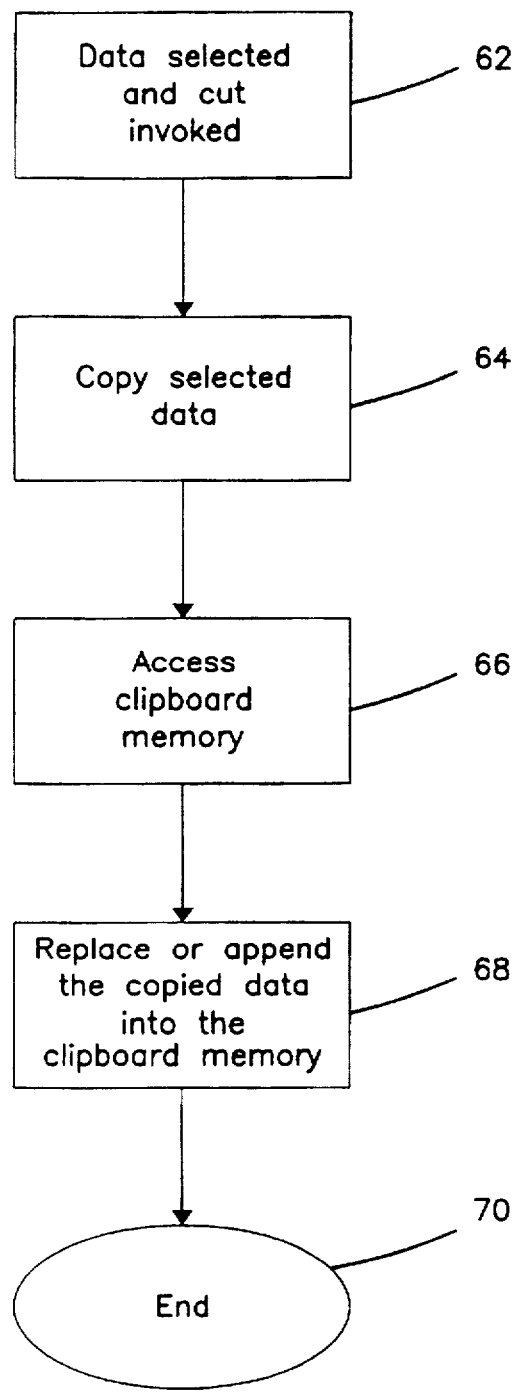
FIG. 4 is a flowchart showing the steps performed by the computer for the cut function.

FIG. 4 is a flowchart showing the steps performed by the computer 10 for the cut function. Block 62 represents the start of the function, wherein data has been selected and the cut function invoked by the operator. Block 64 represents the computer 10 copying the selected data. Block 66 represents the computer 10 accessing the clipboard memory. Block 68 represents the computer 10 replacing or appending the copied data into the clipboard memory. Block 70 represents the termination of the function.

Figure 5:
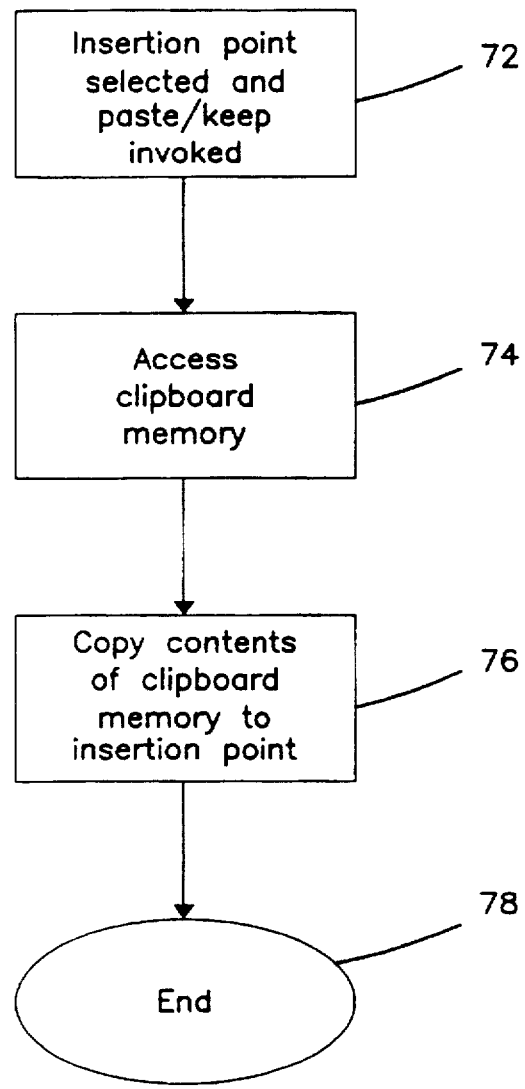
FIG. 5 is a flowchart showing the steps performed by the computer for the paste/keep function.

FIG. 5 is a flowchart showing the steps performed by the computer 10 for the paste/keep function. Block 72 represents the start of the function, wherein data has been selected and the paste/keep function invoked by the operator. Block 74 represents the computer 10 accessing the clipboard memory. Block 76 represents the computer 10 copying the contents of the clipboard memory to the selected insertion point on the monitor 12. Block 78 represents the termination of the function.

Figure 6:
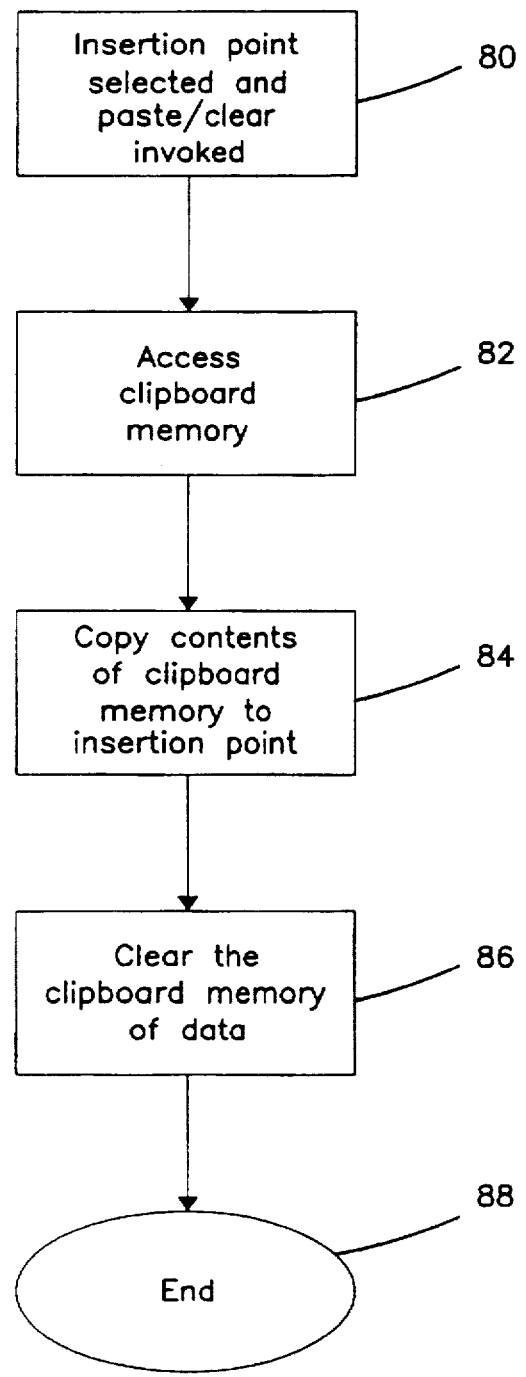
FIG. 6 is a flowchart showing the steps performed by the computer for the paste/clear function.
Figure 7:
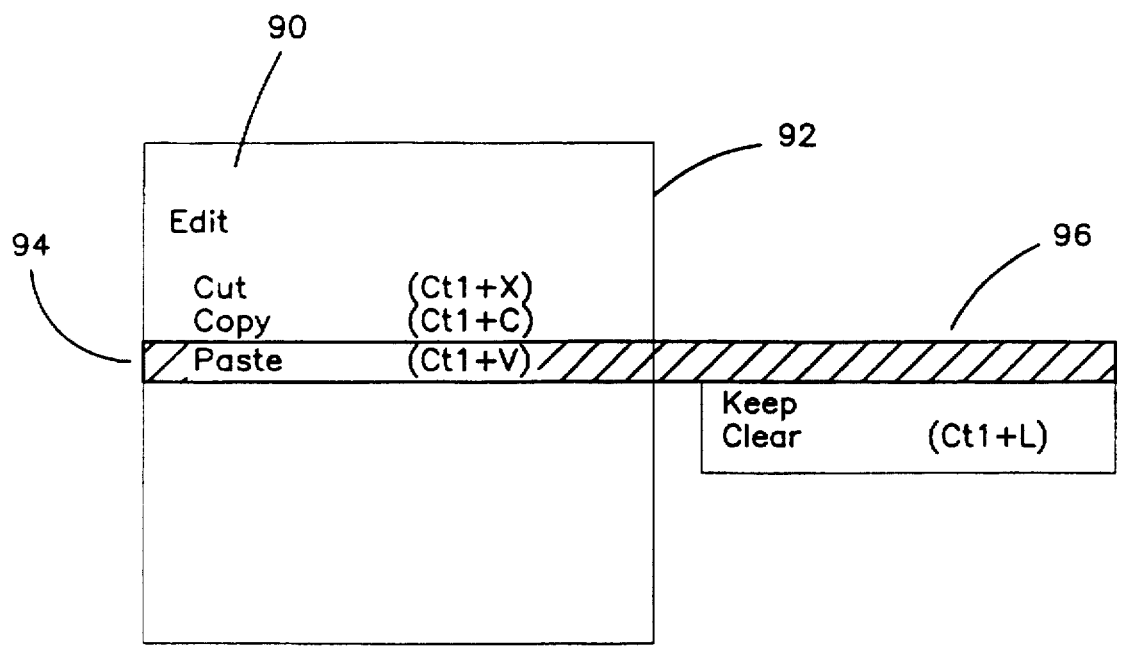
FIG. 7 illustrates one possible embodiment of the user interface displayed on the monitor according to the present invention.

FIG. 6 is a flowchart showing the steps performed by the computer 10 for the paste/clear function. Block 80 represents the start of the function, wherein data has been selected and the paste/clear function invoked by the operator. Block 82 represents the computer 10 accessing the clipboard memory. Block 84 represents the computer 10 copying the contents of the clipboard memory to the selected insertion point. Block 86 represents the computer 10 clearing the clipboard memory. Block 88 represents the termination of the function. FIG. 7 illustrates one possible embodiment of the user interface displayed on the monitor 12 according to the present invention. When the user moves the pointer to the Edit command 90 and presses a button on the mouse, a pull-down menu 92 is displayed on the monitor 12. The pull-down menu 92 includes mnemonics for the Copy, Cut, and Paste commands. In the prior art, the operator would position the mouse cursor on the desired command and invoke the command by depressing one of the mouse buttons. In the preferred embodiment of the present invention, the positioning of the mouse cursor on the paste command 94 results in the display of a cascading sub-menu 96 on the monitor 12. This submenu 96 includes the keep and clear sub-commands or options for the paste command. The operator positions the mouse cursor on the desired sub-command or option and invokes the sub-command or option by depressing one of the mouse buttons. The key combinations (Ctl+X, Ctl+C, Ctl+V, Ctl+L) shown in the pull-down menus of FIG. 7 are shortcut keys for choosing the associated command without using a mouse. The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of manipulating displayed data on a monitor attached to a computer, comprising the steps of:
   (a) displaying data on the monitor;
   (b) receiving one or more commands from an operator to select an insertion point in the data displayed on the monitor, to paste the contents of a clipboard memory in the computer to the selected insertion point in the data displayed on the monitor, and to selectively keep or clear the contents of the clipboard memory after the contents of the clipboard memory have been pasted to the selected insertion point;
   (c) selecting the insertion point in the data displayed on the monitor in response to the commands;
   (d) pasting the contents of the clipboard memory to the selected insertion point in response to the commands; and
   (e) selectively keeping or clearing the contents of the clipboard memory in accordance with the commands.

2. The method of claim 1, further comprising the step of erasing the selected portion from the data displayed on the monitor.

3. The method of claim 1, wherein the selected portion is all of the displayed data on the monitor.

4. The method of claim 1, wherein the selected portion is a sub-part of the displayed data on the monitor.

5. The method of claim 1, wherein the commands are selected from a pull-down menu.

6. The method of claim 5, wherein the pull-down menu is presented in a cascading manner.

7. The method of claim 1, wherein the commands comprise shortcut keys.

8. An apparatus for manipulating displayed data, comprising:
   (a) a computer having a memory, a monitor, and a data storage device;
   (b) means, performed by the computer, for displaying data on the monitor;
   (c) means, performed by the computer, for receiving one or more commands from an operator to select an insertion point in the data displayed on the monitor, to paste the contents of a clipboard memory in the computer to the selected insertion point in the data displayed on the monitor, and to selectively keep or clear the contents of the clipboard memory after the contents of the clipboard memory have been pasted to the selected insertion point;
   (d) means, performed by the computer, for selecting the insertion point in the data displayed on the monitor in response to the commands;
   (e) means, performed by the computer, for pasting the contents of the clipboard memory to the selected insertion point in response to the commands; and
   (f) means, performed by the computer, for selectively keeping or clearing the contents of the clipboard memory in accordance with the commands.

9. The apparatus of claim 8, further comprising means for erasing the selected portion from the data displayed on the monitor.

10. The apparatus of claim 8, wherein the selected portion is all of the displayed data on the monitor.

11. The apparatus of claim 8, wherein the selected portion is a sub-part of the displayed data on the monitor.

12. The apparatus of claim 8, wherein the first and second operator commands are selected from a pull-down menu.

13. The apparatus of claim 12, wherein the pull-down menu is presented in a cascading manner.

14. The apparatus of claim 8, wherein the first and second operator commands comprise shortcut keys.

15. A program storage device, readable by a computer having a memory and coupled to a data storage device, tangibly embodying one or more programs of instructions executable by the computer to perform method steps for manipulating displayed data on a monitor attached to the computer, the method comprising the steps of:
   (a) displaying data on the monitor;
   (b) receiving one or more commands from an operator to select an insertion point in the data displayed on the monitor, to paste the contents of a clipboard memory in the computer to the selected insertion point in the data displayed on the monitor, and to selectively keep or clear the contents of the clipboard memory after the contents of the clipboard memory have been pasted to the selected insertion point;
   (c) selecting the insertion point in the data displayed on the monitor in response to the commands;
   (d) pasting the contents of the clipboard memory to the selected insertion point in response to the commands; and
   (e) selectively keeping or clearing the contents of the clipboard memory in accordance with the commands.

16. The program storage device of claim 15, further comprising the step of erasing the selected portion from the data displayed on the monitor.

17. The program storage device of claim 15, wherein the selected portion is all of the displayed data on the monitor.

18. The program storage device of claim 15, wherein the selected portion is a sub-part of the displayed data on the monitor.

19. The program storage device of claim 15, wherein the first and second operator commands are selected from a pull-down menu.

20. The program storage device of claim 19, wherein the pull-down menu is presented in a cascading manner.

21. The program storage device of claim 15, wherein the first and second operator commands comprise shortcut keys.

* * * * *